(12) United States Patent
Chekroun et al.

(10) Patent No.: US 10,162,050 B2
(45) Date of Patent: Dec. 25, 2018

(54) ROTARY ANTENNA, SCANNER USING SUCH AN ANTENNA, AND DEVICE FOR INSPECTING PERSONS

(71) Applicant: SAS SWS, Gif sur Yvette (FR)

(72) Inventors: Claude Chekroun, Gif sur Yvette (FR); Gilles Chekroun, Gif sur Yvette (FR)

(73) Assignee: SAS SWS, Gif sur Yvette (FR)

( * ) Notice: Subject to any disclaimer, the term of this patent is extended or adjusted under 35 U.S.C. 154(b) by 470 days.

(21) Appl. No.: 14/782,236

(22) PCT Filed: Apr. 1, 2014

(86) PCT No.: PCT/EP2014/056507
§ 371 (c)(1),
(2) Date: Oct. 2, 2015

(87) PCT Pub. No.: WO2014/161842
PCT Pub. Date: Oct. 9, 2014

(65) Prior Publication Data
US 2016/0025852 A1    Jan. 28, 2016

(30) Foreign Application Priority Data

Apr. 2, 2013  (FR) ..................... 13 52968

(51) Int. Cl.
*G01S 13/88* (2006.01)
*G01S 13/90* (2006.01)
(Continued)

(52) U.S. Cl.
CPC .............. *G01S 13/887* (2013.01); *G01S 7/03* (2013.01); *G01S 13/426* (2013.01); *G01S 13/87* (2013.01);
(Continued)

(58) Field of Classification Search
CPC ........ G01S 13/887; G01S 13/87; G01S 13/90; G01S 13/426; G01S 7/03; G01S 13/9035;
(Continued)

(56) References Cited

U.S. PATENT DOCUMENTS 2,633,532 A   3/1953 Sichak
2,665,381 A   1/1954 Smith et al.
(Continued)

FOREIGN PATENT DOCUMENTS

FR   2 841 387 A1   12/2003
FR   2 855 642 A1   12/2004
(Continued)

OTHER PUBLICATIONS

J. Darricau, Physique et Théorie du Radar (Radar Physics and Theory), vol. 3, 3rd Edition, Chapter 21, pp. 483, Sodipe, Paris 1994.

*Primary Examiner* — Matthew M Barker
(74) *Attorney, Agent, or Firm* — Baker & Hostetler LLP (57) ABSTRACT

The antenna comprises at least one waveguide of rectangular section and a cylinder having an opening along a helical line, the cylinder having a relative rotational movement in relation to the waveguide placed inside the cylinder, the waveguide being open facing the inner face of the cylinder which forms a microwave short-circuit to close the guide, wherein two cavities are produced on each side of the guide, parallel thereto, over its entire length, the openings of the cavities being substantially in the plane of the opening of the guide. The invention applies, for example, to the detection of hidden objects carried by persons, in particular dangerous objects.

13 Claims, 8 Drawing Sheets

(51) Int. Cl.
*H01Q 13/12* (2006.01)
*H01Q 25/00* (2006.01)
*G01S 7/03* (2006.01)
*G01S 13/42* (2006.01)
*H01Q 1/52* (2006.01)
*H01Q 3/12* (2006.01)
*H01Q 13/22* (2006.01)
*H01Q 5/40* (2015.01)
*G01S 13/87* (2006.01)
*H01Q 13/18* (2006.01)

(52) U.S. Cl.
CPC .......... *G01S 13/90* (2013.01); *G01S 13/9035* (2013.01); *H01Q 1/525* (2013.01); *H01Q 3/12* (2013.01); *H01Q 5/40* (2015.01); *H01Q 13/12* (2013.01); *H01Q 13/18* (2013.01); *H01Q 13/22* (2013.01); *H01Q 25/00* (2013.01)

(58) Field of Classification Search
CPC .......... H01Q 13/18; H01Q 13/22; H01Q 3/12; H01Q 1/525; H01Q 5/40; H01Q 13/12; H01Q 25/00
See application file for complete search history.

(56) References Cited

U.S. PATENT DOCUMENTS 2,670,436 A * 2/1954 Dunbar .................... H01Q 3/14
343/761
2,711,440 A * 6/1955 Rines ........................ G01S 1/02
315/5
7,844,081 B2 * 11/2010 McMakin ............. G01S 13/887
382/115

FOREIGN PATENT DOCUMENTS

GB 608494 A * 9/1948 ............. H01P 1/182
WO 98/11453 A1 3/1998

* cited by examiner

ROTARY ANTENNA, SCANNER USING SUCH AN ANTENNA, AND DEVICE FOR INSPECTING PERSONS

CROSS-REFERENCE TO RELATED APPLICATIONS

This application is a National Stage of International patent application PCT/EP2014/056507, filed on April 1, 2014, which claims priority to foreign French patent application No. FR 1352968, filed on April 2, 2013, the disclosures of which are incorporated by reference in their entirety.

FIELD OF THE INVENTION

The present invention relates to an antenna, notably for radar imaging. The invention relates also to an imaging system comprising such an antenna. It applies, for example, to the detection of hidden objects carried by persons, in particular dangerous objects.

BACKGROUND

The surveillance of persons in airports and, more generally, in public places, has become a public safety need. Devices are already in use for the detection of dangerous objects in the airports, and more particularly for prohibited objects hidden by passengers before embarkation. It is known practice to use metal detectors. However, there are non-metallic dangerous objects, in particular explosive products which are undetectable with such devices.

It is also known practice to use X-ray images to detect the presence of suspicious objects carried by passengers. To this end, the entire length of the body of the passengers has to be scanned by X-ray. This solution poses public health problems through exposure to the X-rays and above all it does not make it possible to handle significant flows of passengers because the processing time cannot be compressed. There are radar imaging solutions which could partly overcome these problems but they are costly and complex to implement.

A French patent application FR 03 06429 describes a device making it possible to partly address these problems. The device comprises an antenna of cylindrical type which presents certain drawbacks, particularly with regard to the microwave leaks.

SUMMARY OF THE INVENTION

One aim of the invention is notably to improve the performance levels of such an antenna and an imaging system comprising same. To this end, the subject of the invention is an antenna, a scanner and an inspection device as described by the claims.

BRIEF DESCRIPTION OF THE DRAWINGS

Other features and advantages of the invention will become apparent from the following description, given in light of the attached drawings which represent.

DETAILED DESCRIPTION

Figure 1:
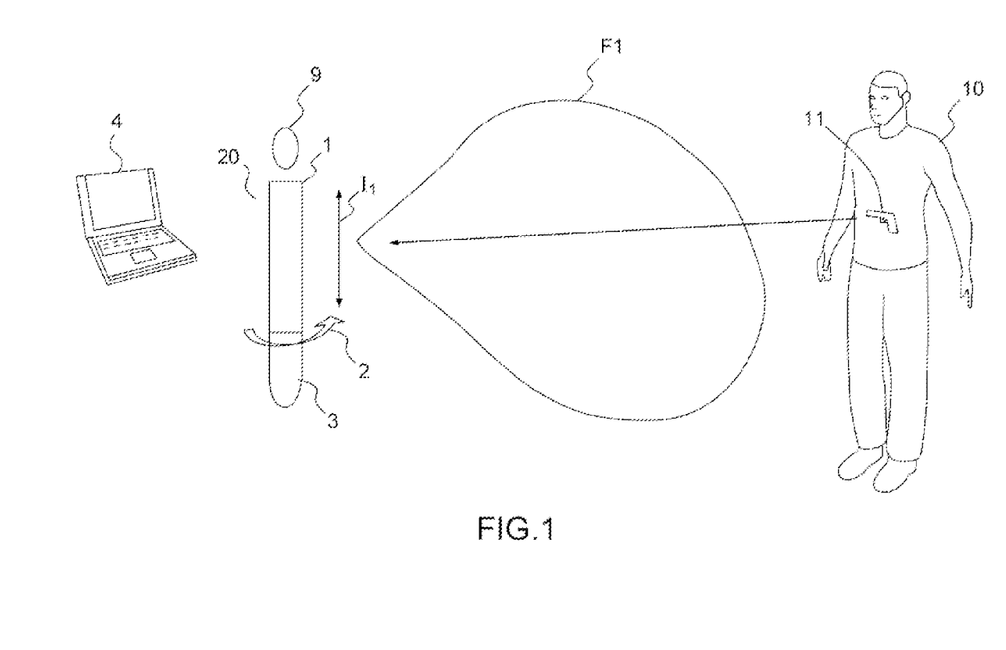
FIG. 1, an illustration of the principle of operation of an antenna according to the invention.

FIG. 1 illustrates, through a block diagram, the principle of operation of a radar imaging system using an antenna according to the invention. Such a system will hereinafter be called scanner.

By way of example, the scanner 20 is equipped to detect objects 11 carried by a person 10. The system therefore comprises an antenna 1 which produces at least one transmission beam $F_1$. The antenna 1 is linked to a radar 9, more particularly to its transmission and reception means. The latter are themselves linked to processing means. The latter are, for example, conventional radar imaging processing means producing a radar image which can be viewed on a screen 4. The radar 9 operates, for example, at the frequency of 77 GHz.

The beam $F_1$ transmits in a band about a specific frequency $f_1$. The phase center of each beam is displaced over a length $l_1$ such that it scans the useful detection length, for example the height of a person, the object to be observed being a person 10 on which the aim is to detect prohibited objects in the case of FIG. 1. As will be seen hereinbelow, the displacement of the beam is obtained by the rotation 2 of a cylindrical part of the antenna, this part being driven by a motor 3.

Figure 2:
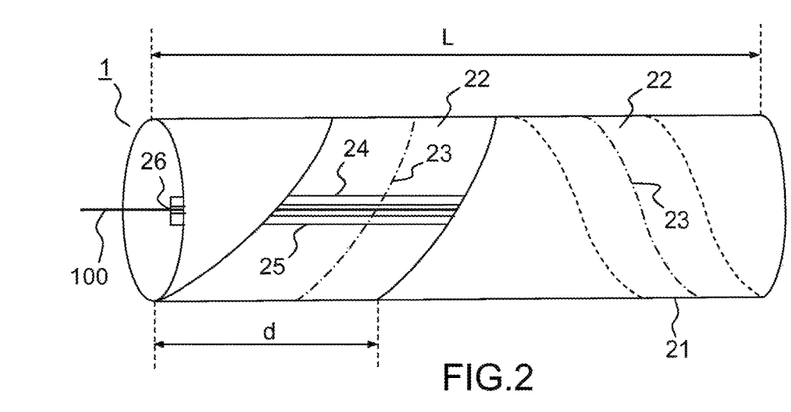
FIG. 2, an illustration of the principle of production of an antenna according to the invention.

FIG. 2 illustrates the principle of production of an antenna according to the invention. The antenna comprises a metal cylinder 21 having a radiant opening 22 along a helical line 23 spanning the revolution of the cylinder. The antenna comprises at least one pair of waveguides 24, 25 arranged inside the cylinder and open toward the inner wall of the cylinder. One waveguide 24 is reserved for transmission and the other waveguide 25 is reserved for reception. The transmission guide 24 is linked to the transmission means of the radar and the reception guide 25 is linked to the reception means of the radar. The cylinder 21 and the waveguides 24, 25 have a relative rotational movement in relation to the axis 100 of the cylinder. Preferably, the guides remain fixed and the cylinder 21 is driven in a rotational movement by means of the motor 3. The guides 24, 25 are placed on a support 26 arranged inside the cylinder 21.

Figure 3:
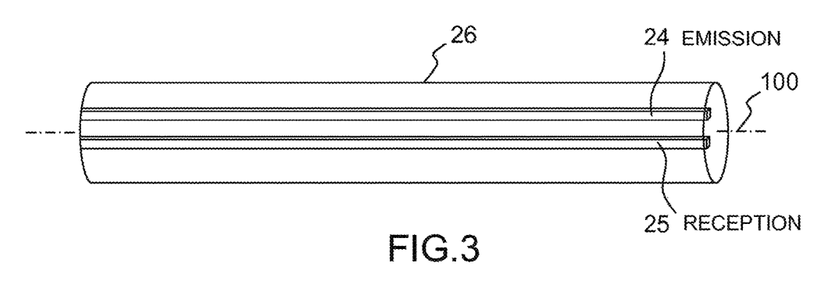
FIG. 3, an exemplary embodiment of the support of the waveguides inside the antenna.

FIG. 3 illustrates an exemplary embodiment of the support 26 of the waveguides 24, 25. This support 26, arranged inside the first cylinder 21, forms the stator in the case where this cylinder 21, the rotor, is driven in a rotational movement. The waveguides 24, 25 are arranged on the cylinder 26.

Figure 4:
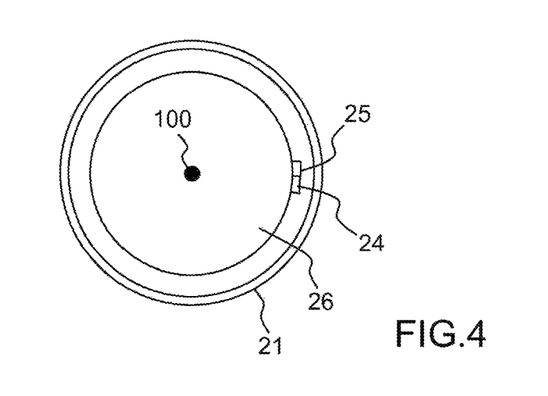
FIG. 4, the arrangement of the support relative to the outer cylinder of the antenna.

FIG. 4 shows, by a cross-sectional view, the arrangement of the inner cylinder 26 relative to the outer cylinder 21, the two cylinders having the same axis of symmetry 100. The diameter of the inner cylinder 26 is defined in such a way that the radiant face of the guides is at a given distance that will be specified hereinbelow. When the radiant face is facing the inner metallized part of the cylinder, and not the opening, this metallized face acts as a microwave short-circuit, thus avoiding spurious reflections.

Figure 5A:
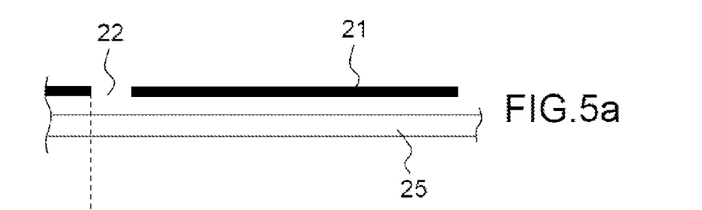
FIGS. 5a, 5b and 5c, an illustration of the detection mode provided by an antenna according to the invention.
Figure 5B:
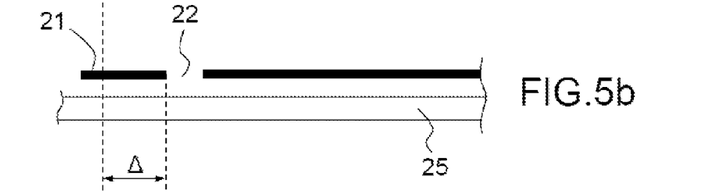
Figure 5C:
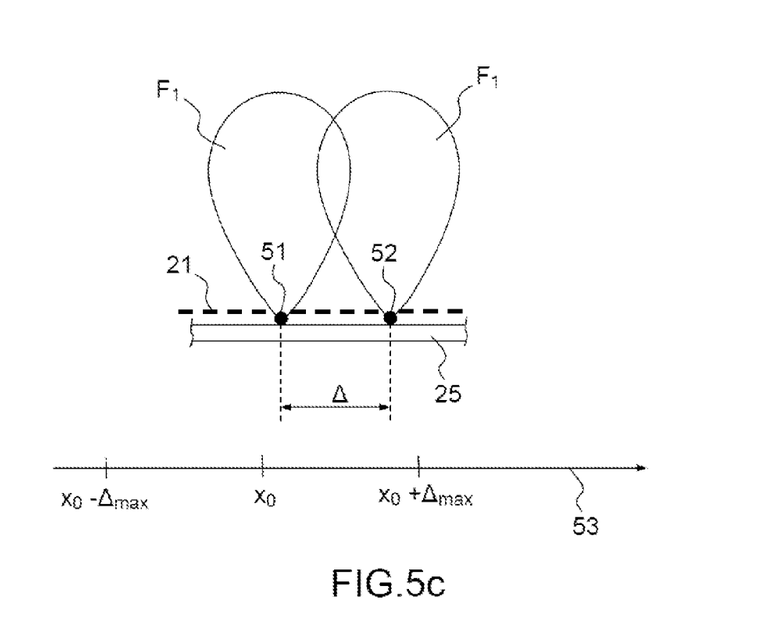

FIGS. 5a, 5b and 5c illustrate the operation of an antenna as described previously, more particularly the detection mode that it allows. In this example, the number of beams is equal to 1. In operation, the parts of the guide 24, 25 which face the metallized wall of the cylinder 21 do not radiate, because of the distance $\lambda/2$ which creates a microwave short-circuit. The parts of the guides which are facing the opening 22 participate in the radiation of the antenna, in transmission and in reception. In fact, because of the shape of the opening 22 along a helix and its rotation about a guide, this opening behaves for the latter as a sliding opening moving backwards and forwards rectilinearly. FIG. 5a illustrates a position of the radiant opening 22 facing the transmission guide 24 at a given instant $t_0$. FIG. 5c illustrates the antenna beam $F_1$ associated with the position of FIG. 5a with its phase center 51 situated level with the transmission guide 24, the illuminator. The beam $F_1$ here represents the angular coverage of the antenna. FIG. 5b illustrates the same elements as those of FIG. 5a, but at a subsequent instant $t_0+\Delta t$. In the drawing of the figure, the opening facing the guide is then staggered by a distance A as a result of the rotation of the cylinder 21. The antenna beam $F_1$ corresponding to the cylinder position 21 of FIG. 5b is represented with its phase center 52 which is staggered by a distance A. The rotation of the cylinder therefore allows the continuous displacement of the phase center of the radiation and therefore of the beam $F_1$. Along the axis 53 of the guide 24, parallel to the axis 100 of the cylinder, the phase center is displaced between a position $x_0-\Delta_{Max}/2$ and $x_0+\Delta_{Max}/2$. The amplitude of the displacement $\Delta_{Max}$ depends on the pitch of the helix 23 that the radiant opening follows. The speed of rotation of the cylinder 21 is such that the phase center 52 is displaced linearly at a speed which can reach 3000 m/s.

The width of the beam $F_1$ is a function of the width d of the radiant opening. The smaller the width d, the wider the antenna beam. The width at 3 dB of the beam $F_1$ is $\lambda/d$, in which $\lambda$ is the transmitted wavelength. The scanning principle is the same in reception with the reception guide 25.

The rotation of the cylinder therefore allows the continuous displacement of the phase center of the radiation, and thus makes it possible to obtain an operation of synthetic antenna radar type, or SAR. This property is used by the processing means of the radar 9 to obtain and analyze high-resolution radar images. As a reminder, synthetic antenna radars are radars whose antenna is oriented at right angles to the route of the carrier. It is the carrier of the radar, and more particularly of the antenna, which, in its displacement, causes the space to be observed. In the present case, the displacement of the carrier is simulated by the displacement of the phase center. The two dimensions of the radar image are defined by the direction of propagation and the displacement of the carrier. The spatial resolution, which conditions the fineness of the observed image, is therefore obtained:

in the direction at right angles to the movement of the carrier by the distance resolution of the radar;

in the direction of the movement of the carrier by the width of the beam F1.

The processing of SAR type is notably described in the work by J. Darricau: Physique et Théorie du Radar (radar physics and theory)—volume 3, 3rd edition—chapter 21, page 483—published by Sodipe, Paris 1994.

A set of receivers arranged along the axis 53 is then reconstituted in time as in an application of SAR type, thus making it possible to produce radar images of simple forms. In effect, from detected bright spots, a signal reconstruction is performed making it possible to produce images, notably of dihedrons of small dimensions. A bright spot is a spot or an individual surface area reflecting the electromagnetic waves. From images of simple forms, it is possible to reconstruct hidden objects.

Figure 6A:
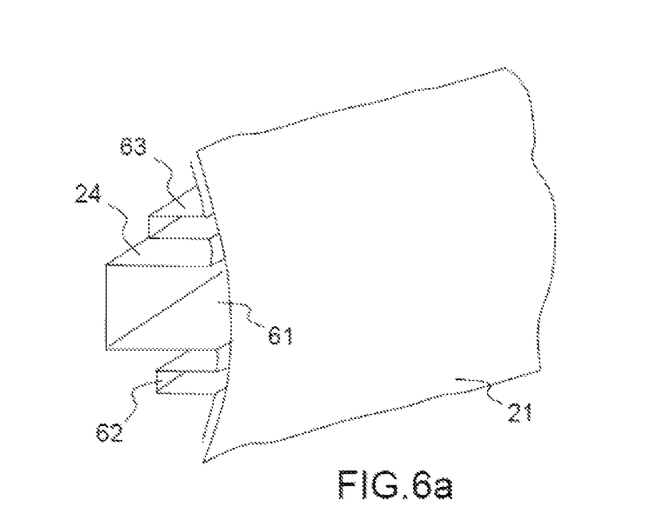
FIGS. 6a and 6b, an illustration of the embodiment of the guides and of their coupling to the outer cylinder in an antenna according to the invention.
Figure 6B:
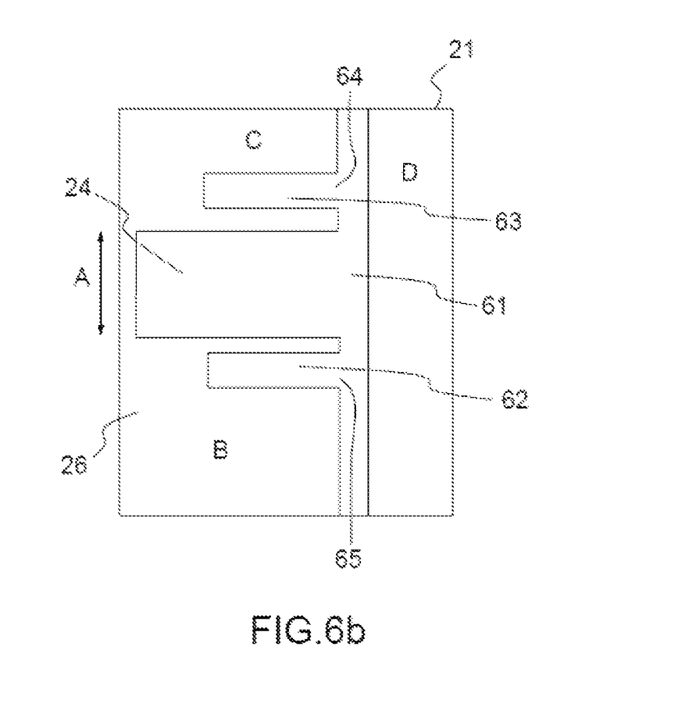

FIGS. 6a and 6b illustrate the embodiment of the guides and their couplings to outer cylinder 21. FIG. 6a is a partial perspective view. FIG. 6b is a view in partial cross section in which the radius of curvature has not been represented for the purposes of simplification.

The production of a guide is described, and the transmission guide 24 is considered by way of example. The reception guide 25 is produced and coupled in the same way.

The waveguide 24 is a guide with rectangular section comprising a radiant opening 61. The metallized inner face of the outer cylinder 61 forms a short-circuit to close the guide. The rotation of the cylinder 21 about the guide 24 causes a radiant slot to be created which is displaced along this guide. The latter is linked by one end to the transmission circuits of the radar 9. It is linked at its other end to a matched load.

According to the invention, two parallel cavities 62, 63 are produced on each side of the guide 24, over its entire length. The openings 64, 65 of the cavities are substantially in the plane of the opening 61 of the guide, more specifically in a same line of curvature. Advantageously, these cavities trap the microwave waves and very greatly limit, even eliminate, the microwave leaks.

These cavities 62, 63 are less wide and less deep than the guide. The dimensions are, for example, as follows, A being the transmitted wavelength, corresponding to the central frequency:

depth of the guide 24: $0.75\lambda$;

width of the guide 24: $0.35\lambda$;

depth of a lateral cavity 62, 63: $0.25\lambda$;

width of a lateral cavity 62, 63: $0.12\lambda$.

The distance between the opening 61 of the guide and the openings 64, 65 of the cavities on the one hand and the inner face of the cylinder 21, can range from $0.1\lambda$ to $2\lambda$. In a case of application with a radar 9 operating at 77 GHz, $\lambda$ is of the order of a few millimeters.

In the example of FIGS. 6a and 6b, the guide transmits according to the component E, the radiant opening being produced on a small side of the guide.

FIG. 6b presents an embodiment in which the guide 24 and the cavities 62, 63 are produced in the inner cylinder 26. To this end, this cylinder can be metallic. Its diameter can be of the order of a few centimeters.

Figure 7:
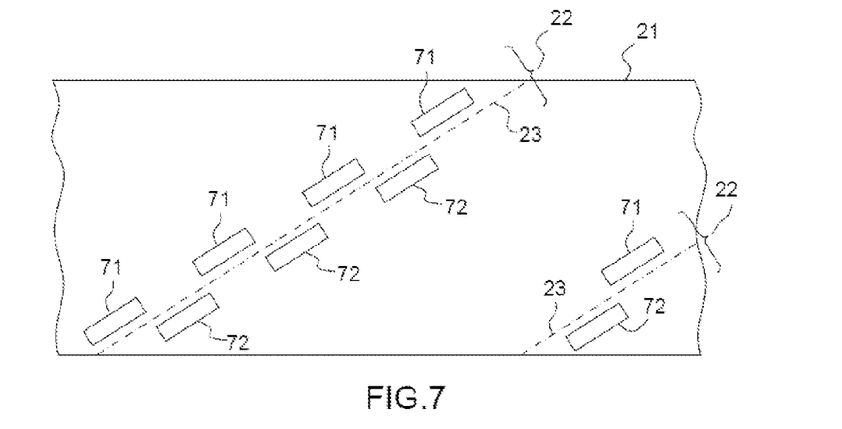
FIG. 7, a possible embodiment of the radiant opening of an antenna according to the invention.

FIG. 7 presents a possible embodiment of the radiant opening 22. FIG. 2 shows that the radiant opening 22 follows a spiral line 23 around the cylinder 21.

More particularly, FIG. 7 presents the cylinder in a partial developed view in a plane. The cylinder 21 is obtained by winding the surface shown in FIG. 7. The helical line 23 around the cylinder is represented on this flat surface.

The radiant opening 22 is formed by a succession of individual openings 71, 72 arranged on each side of the line 23. A first series of individual openings 71 is arranged on one side and a second series of individual openings 72 is arranged on the other side. The positions of the openings 72 of the second series are staggered relative to the positions of the openings 71 of the first series such that the radiant opening 22 is formed in succession by an opening 71 on one side of the line 23 then an opening 72 arranged on the other side, and so on. Preferably, the openings 71, 72 do not overlap, but the helical line 23 is continually edged by an opening 71, 72.

These openings can be rectangular, the large side being arranged along the line 23.

Advantageously, the production of the radiant opening 22 based on these individual openings is simple to do. Moreover, these individual openings, of small dimensions, do not deform, or deform very little, under the effect of the centrifugal force due to the high speed of rotation of the cylinder 21. The radar processing can take account of the form of the radiant opening and notably of the interleaved arrangement of the radiant openings on each side of the helical line 23.

Figure 8A:
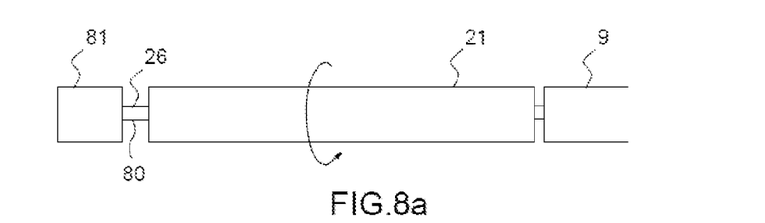
FIGS. 8a and 8b, an example of connections of the waveguides.
Figure 8B:
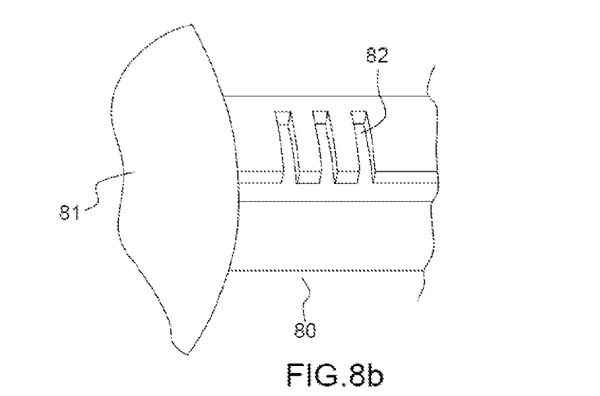

FIGS. 8a and 8b illustrate the connections of the guides 24, 25 at the two ends of the support cylinder 26. At one end, the guides 24, 25 are linked to the transmission and reception circuits of the radar 9. This link is made conventionally and easily in as much as the guides are fixed relative to the radar, the outer cylinder 21 being the only one driven by a rotational movement. At the other end, the guides are connected to a matched microwave load 81, defined to avoid standing waves. To improve the matching, one or more cavities 82 are produced, at right angles to the guides. These cavities emerge on the guide at right angles to its length. They have for example the same depth and the same width as the guides. Advantageously, they trap waves reflected at the end and thus considerably reduce the standing wave ratio. FIG. 8b presents an example with three cavities, making it possible to obtain an optimum result. A single cavity can optionally be placed.

Figure 9:
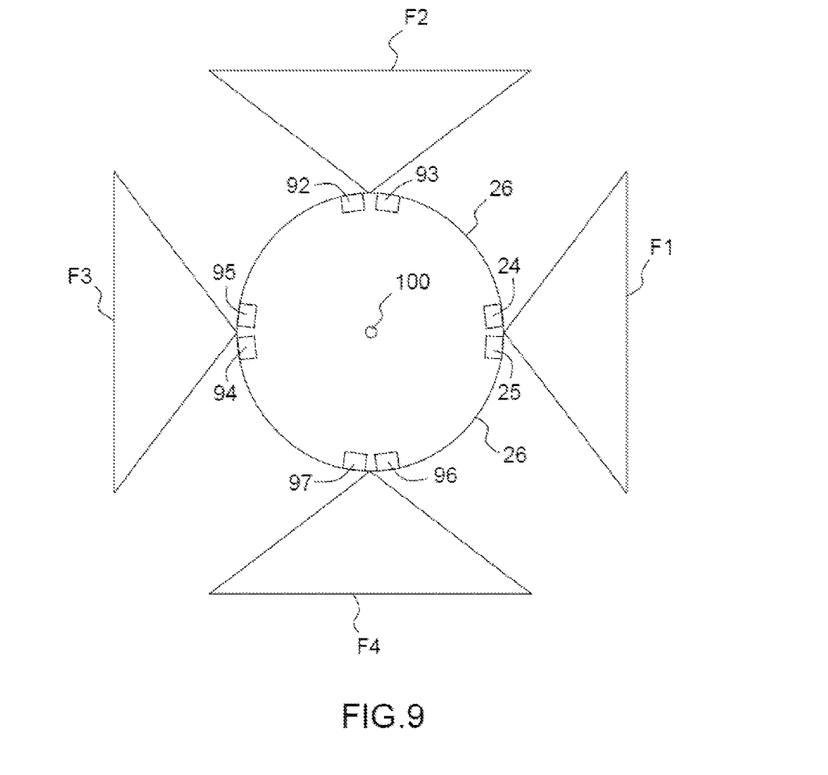
FIG. 9, an exemplary embodiment of an antenna according to the invention allowing for a detection field over 360°.

FIG. 9 illustrates an exemplary embodiment of an antenna according to the invention allowing viewing over 360°, for a four-quadrant detection system. In this figure, the rotating cylinder 21 is not represented. The fixed cylinder 26 is presented by a cross-sectional view with four pairs of waveguides 24, 25, 92, 93, 95, 96, 97, 98 arranged thereon, each of the pairs being separated by 90° producing four beams F1, F2, F3, F4 in four directions regularly distributed about the axis 100 of the antenna.

The guides are, for example, produced in the cylinder 26. Each pair of guides is produced like the pair 24, 25 described previously. Four beams F1, F2, F3, F4 are thus obtained, scanning the space about the axis 100 of the antenna over a distance equal to the pitch of the helix 23 of the radiant opening. The directions of the beams F1, F2, F3, F4 are respectively at 0°, 90°, 180° and 270°.

Figure 10:
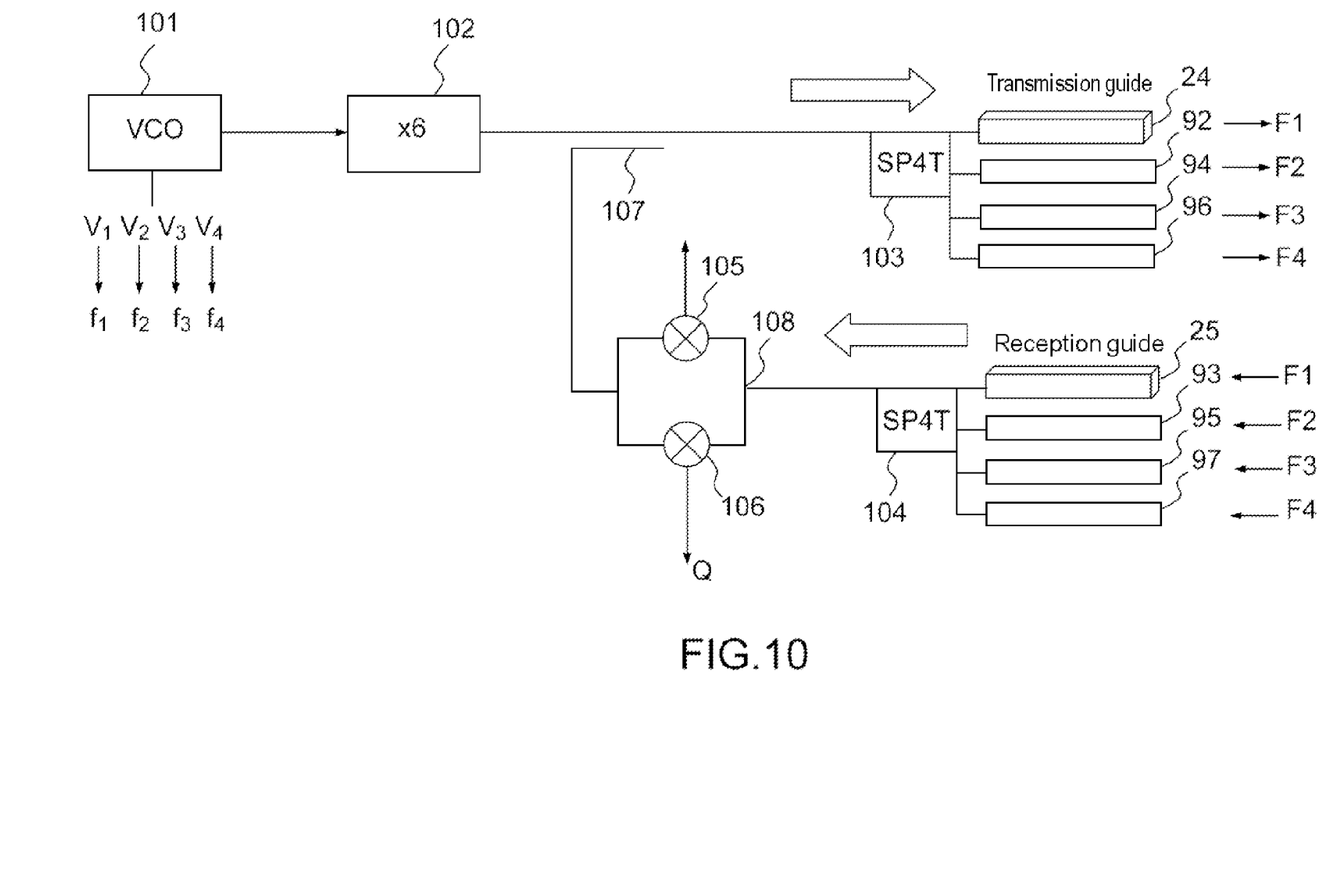
FIG. 10, an exemplary embodiment of the transmission and detection circuits of a radar equipped with an antenna according to the invention.

FIG. 10 illustrates an exemplary embodiment of the transmission and reception circuits corresponding to the antenna architecture presented in FIG. 9. The frequency generation is produced by a voltage-controlled oscillator 101, called VCO. More particularly, the generator 101 produces four frequencies $f_1$, $f_2$, $f_3$, $f_4$ intended respectively for the beams F1, F2, F3, F4 described previously. A frequency thus characterizes each of the four directions of observation.

A frequency multiplier 102 is for example connected at the output of the generator. The frequencies are thus multiplied to reach frequencies close to the central frequency, equal to 77 GHz for example. The multiplier 102 can also have an amplification function. The latter is linked at the output to the input of a switch 103 of SP4T type. Each of the four outputs of the switch is coupled to a transmission guide 24, 92, 94, 96 of the fixed cylinder 26. The switch 103 is synchronized with the frequency generator 101 to switch the frequencies $f_2$, $f_3$, $f_4$ to the guides which are allotted to them, these frequencies $f_1$, $f_2$, $f_3$, $f_4$ being generated in succession by the generator 101. A multiplexing of the frequencies to the guides is thus performed with no particular time constraints because the objects to be analyzed, notably objects carried by passers-by, move slowly.

In reception, a second switch 104, of SP4T type, is coupled to the reception guides 25, 93, 95, 97, each guide being linked to an input of the switch. The output of the switch 104 is linked, via a 3 dB coupler 108, to two mixers 105, 106. The other input of the mixers is linked to the output of a coupler 107 placed on the transmission line. A fraction of the transmitted wave is thus mixed with the reception signals, thus forming a reception of homodyne type. A mixer 105 supplies as output the forward component I(t) of the received signals and the second mixer supplies as output the quadrature component Q(t) of the received signals. The duly measured components are then taken into account by the radar processing means for the computation of the image.

The formation of the image Im($x_i$,$y_j$) at a point ($x_i$,$y_j$) is performed by the integration of the signals received in an analysis time T. The image Im($x_i$,$y_j$) is then given by the following relationship:

$$Im(x_i, y_i) = \int_0^T (I(t) + iQ(t)) \cdot \exp\left[-i\frac{4\pi}{\lambda}(L(x_i, y_j, t))\right]$$

in which L($x_i$,$y_j$,t) is the distance between the radiant opening at the instant t and the analysis point ($x_i$,$y_j$) on the individual, $\lambda$ representing the wavelength.

Figure 11:
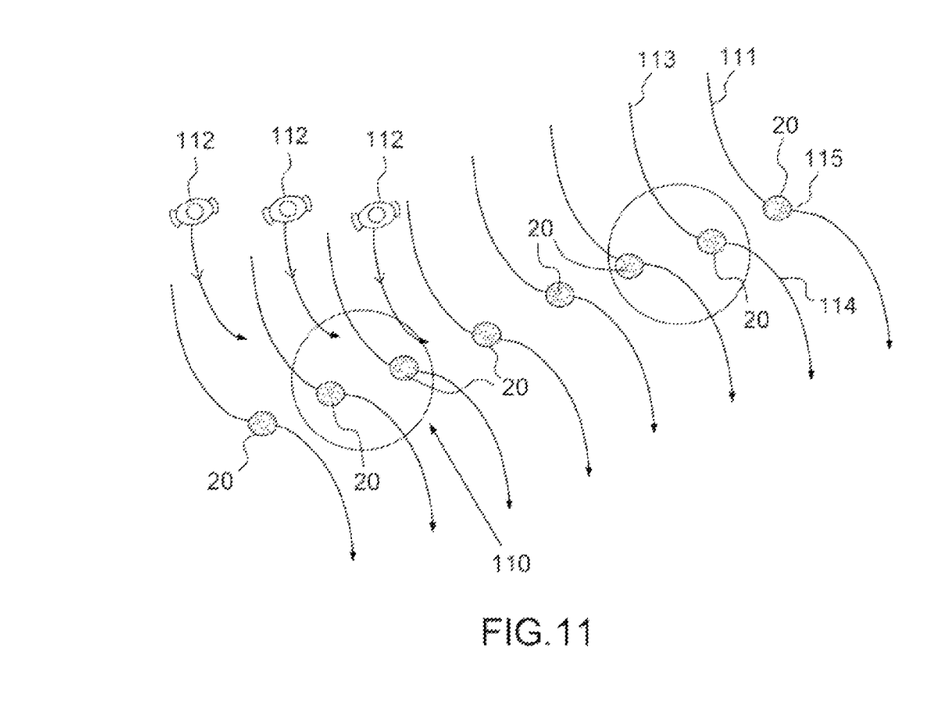
FIG. 11, an exemplary embodiment of an inspection device according to the invention.

FIG. 11 illustrates an inspection device according to the invention. The device uses a set of scanners 20 as illustrated by FIG. 1 equipped with an antenna 1 according to the invention, in a four-quadrant configuration in accordance with FIG. 9. The device also comprises a set of contiguous corridors 110. The corridors can be delimited by walls 111, but other delimiting means are possible. These corridors are followed by the passers-by 112 to be inspected, for example passengers of an aeroplane before embarkation. They serve in fact to guide the path of the passengers before and after the passage between two scanners 20. The device comprises a number of parallel corridors in order to obtain a significant flow of persons to be inspected. The number of corridors depends on the flow to be achieved. In a particular case, the device comprises a single corridor and two scanners.

According to the invention, the corridors follow a particular curvature and the scanners are placed at a specific point of the curvature. Each corridor follows a first curvature 113 then a second curvature 114 that is opposite to the first. The limits 111 of the corridors follow these curvatures. The scanners are shrewdly placed on the limits of the corridors at the points 115 where the curvatures change direction, or at substantially close points. In this way, an exhaustive view of the passers-by is obtained by the radar imaging of the scanners. A complete front view of the passers-by 112 is obtained by means of the two scanners 20 of a corridor, when the passers-by are upstream of the scanners, at least by the scanner that most fully faces the passers-by. A complete view of the back of the passers-by 112 is obtained by means of these two scanners when the passers-by are downstream, at least by the other scanner. The complete side view of the passers-by is obtained when the latter pass between the scanners.

When the radar image reveals the presence of an object that is likely to be dangerous, an alarm can be tripped. It can be tripped automatically or by a person viewing the radar images on a screen 4.

A device as illustrated by FIG. 11 makes it possible to obtain a very high degree of passage fluidity. Thus, 300 persons per hour can pass through a corridor and be inspected with total reliability.

Advantageously, such a device can be used at the entry to embarkation halls to inspect the passengers in order to detect potential dangerous objects carried by these passengers.

The invention claimed is:

1. An antenna comprising:
a plurality of waveguides each comprising a rectangular cross-section and an opening; and
a cylinder having at least one opening arranged along a line that defines a helical shape around the cylinder, said cylinder is configured to move relative to the waveguides, said waveguides are disposed inside said cylinder, wherein
the waveguides are open facing an inner face of said cylinder which forms a microwave short circuit to close the waveguides,
two cavities are provided on each side of each of the waveguides, parallel thereto, over an entire length of the respective waveguide,
the cavities include openings that are substantially in the plane of the opening of the respective waveguide, and
the waveguides comprising four pairs of waveguides, the four pairs of waveguides are arranged at ninety degree intervals around the cylinder, and each pair of waveguides comprising a transmission guide and a reception guide.

2. The antenna as claimed in claim 1, wherein the at least one opening of the cylinder is formed by a succession of individual openings arranged on each side of the line, a first series of individual openings is arranged on one side and a second series of individual openings is arranged on the other side, the positions of the openings of the second series being staggered relative to the positions of the openings of the first series such that a radiant opening is formed in succession by an opening on one side of said line then an opening arranged on the other side, and so on.

3. The antenna as claimed in claim 2, wherein said openings are rectangular and include a first side and a second side, the first side being larger than the second side, the first side being arranged along the line.

4. The antenna as claimed in claim 1, wherein,
the waveguides are each connected at one end to transmission and reception circuits of a radar and at an other end to a matched load, and
at least one additional cavity, in addition to the two cavities, is provided on each of the waveguides at said other end, the at least one additional cavity extending in a direction perpendicular to a length of the respective waveguide.

5. The antenna as claimed in claim 1, further comprising a motor that is configured to drive the cylinder to move the cylinder relative to the waveguides.

6. The antenna as claimed in claim 1, wherein the antenna is configured to operate in conjunction with a millimetric radar.

7. A scanner for delivering a radar image, comprising at least:
an antenna as claimed in claim 1;
a millimetric radar; and
a display that is configured to display said image, wherein the antenna is linked to transmission and reception circuits of said radar,
antenna beams radiated by the waveguides are configured to be displaced parallel to an axis of the antenna when the cylinder is rotating, and
the radar is configured to produce an image of a target from signals received from said target.

8. The scanner as claimed in claim 7, wherein
the transmission and reception circuits comprise at least:
a generator of frequencies, each frequency being assigned to a given pair of waveguides;
a first switch configured to switch signals from said generator to the transmission guides synchronously with the generation of frequencies; and
a second switch configured to switch signals from the reception guides to the reception circuits, synchronously with the frequency generation.

9. The scanner as claimed in claim 7, wherein the reception circuits comprise at least:
a coupler connected to the transmission line;
a first mixer configured to receive as input a signal from the coupler and a reception signal; and
a second mixer configured to receive as input a signal from the coupler and a reception signal phase offset by $\pi/2$.

10. The scanner as claimed in claim 7, wherein the antenna beams are configured to scan a space by 360° about the axis.

11. A device for inspecting persons, comprising:
at least one curved corridor, exhibiting a first curvature and a second curvature opposite to the first curvature;
scanners as claimed in claim 10, two scanners per corridor being placed substantially at the point where the curvature changes direction, the persons to be inspected pass between said two scanners, said scanners producing radar images over 360°.

12. The inspection device as claimed in claim 11, wherein the corridors are contiguous.

13. The inspection device as claimed in claim 11, wherein the inspection device is configured to inspect passengers in embarkation zones.

* * * * *